United States Patent [19]
Goto et al.

[11] Patent Number: 5,136,317
[45] Date of Patent: Aug. 4, 1992

[54] CAMERA HAVING A MAGNETIC HEAD, FILM MEANS LOADABLE TO THE SAME AND A CAMERA SYSTEM

[75] Inventors: Tetsuro Goto, Funabashi; Kazuyuki Kazami, Tokyo, both of Japan

[73] Assignee: Nikon Corporation, Tokyo, Japan

[21] Appl. No.: 814,222

[22] Filed: Dec. 23, 1991

Related U.S. Application Data

[63] Continuation of Ser. No. 617,762, Nov. 26, 1990, abandoned.

[30] Foreign Application Priority Data

Dec. 1, 1989 [JP] Japan .................................. 1-310791

[51] Int. Cl.[5] .............................................. G03B 7/00
[52] U.S. Cl. ........................................ 354/21; 354/76
[58] Field of Search .................... 354/21, 75, 76, 105, 354/106, 275; 15/D12, D13; 51/328, 135 R, 137

[56] References Cited

U.S. PATENT DOCUMENTS

| | | | |
|---|---|---|---|
| 2,606,409 | 8/1952 | Gordon | 51/328 X |
| 3,078,759 | 2/1963 | Brunswick | 15/DIG. 12 X |
| 4,860,037 | 8/1989 | Harvey | 354/21 |

Primary Examiner—L. T. Hix
Assistant Examiner—David M. Gray
Attorney, Agent, or Firm—Shapiro and Shapiro

[57] ABSTRACT

A camera uses a film cartridge containing photographic film having a magnetic medium for the recording of data by a magnetic head of the camera. To clean the head a cartridge containing a cleaning film is loaded in the camera. The camera detects the loading of this cartridge, inhibits the operation of an exposure mechanism, and winds and rewinds the cleaning film. The number of cleaning operations may be stored in a memory of the camera, and the cleaning film may have a magnetic medium on which the number of cleaning operations by the cleaning film is recorded by the magnetic head and from which the number of recorded cleaning operations is read by the magnetic head.

14 Claims, 5 Drawing Sheets

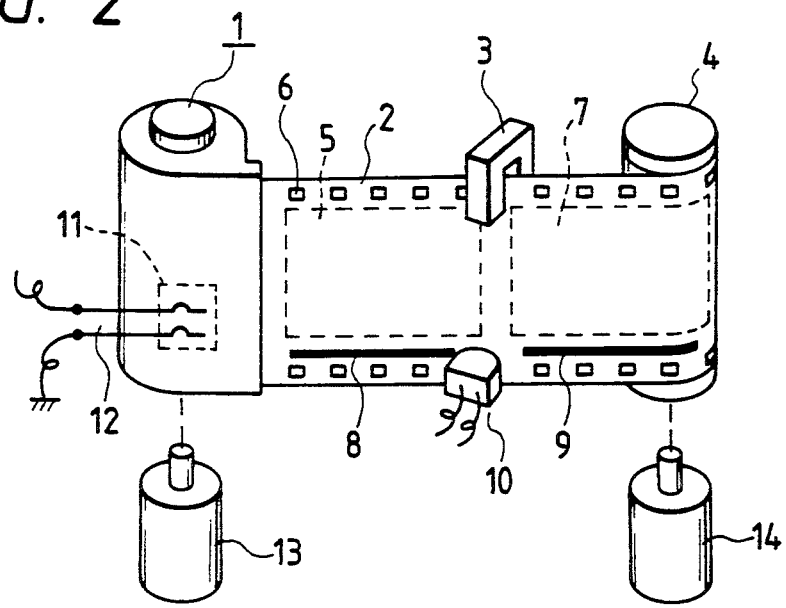
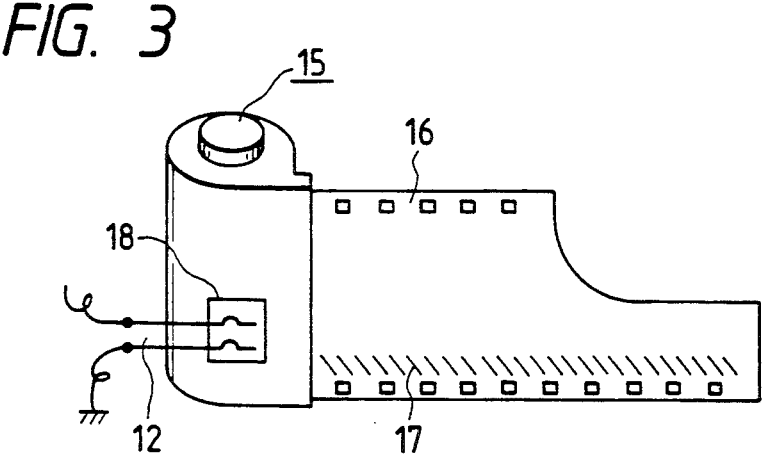
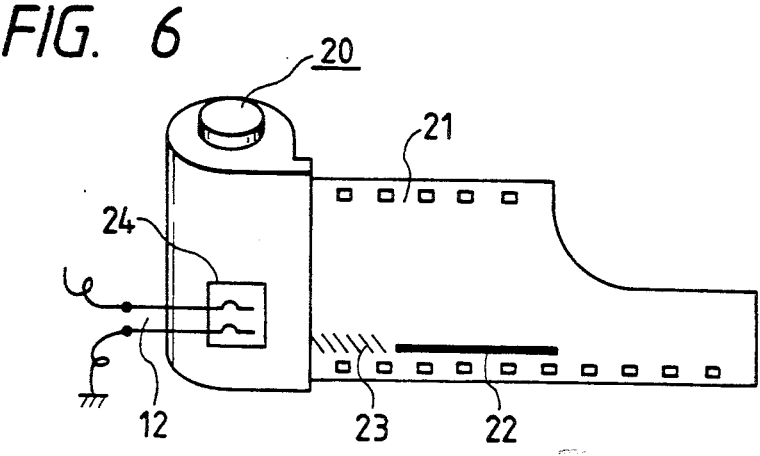

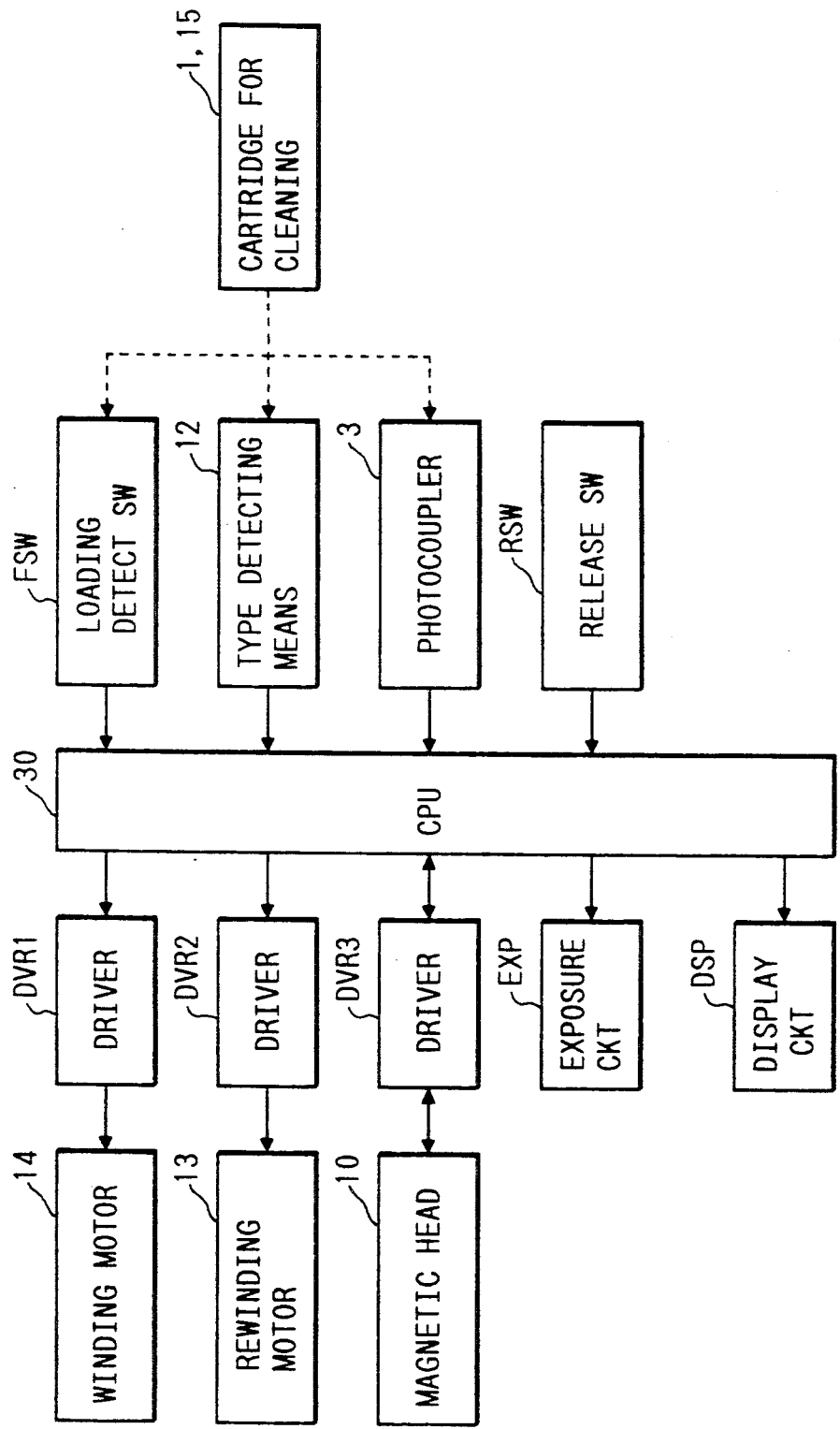

CAMERA HAVING A MAGNETIC HEAD, FILM MEANS LOADABLE TO THE SAME AND A CAMERA SYSTEM

This is a continuation of application Ser. No. 617,762 filed Nov. 26, 1990 (now abandoned).

BACKGROUND OF THE INVENTION

1. Field of the Invention

The present invention relates to a camera which can record information on a magnetic recording medium formed on a silver salt film (hereinafter referred to as a film), film means loadable to such a camera and a camera system.

2. Related Background Art

In an 8 mm talkie, a magnetic track which is a magnetic recording medium is formed on a film so that sound information is recorded as magnetic record information. In a conventional camera, date and time information of photographing is recorded on a film as optical record information by means of optical imaging.

Recently, a camera which records information on a magnetic track formed on a 35 mm film to allow recording of information other than optical record information has been proposed.

However, because of contact between a magnetic head and a magnetic tape, powders of magnetic material of the tape deposit on a surface of the magnetic head after a certain period of use and this deteriorates a recording characteristic.

SUMMARY OF THE INVENTION

It is an object of the present invention to provide a camera which has a function of cleaning a magnetic head of the camera, film means and a camera system.

As shown in FIG. 1A, a camera having a magnetic head in accordance with the present invention comprises exposure control means 31 for effecting conventional exposure control, film winding means 32, film rewinding means 33, film discriminating means 35 for discriminating that a loaded film is a cleaning film and producing a discrimination signal, and control means 34 for enabling the exposure control means when the loaded film is a conventional photographing film, and inhibiting the exposure control means and causing the winding means 32 to wind the film and then causing the rewinding means 33 to rewind the film when the loaded film is the cleaning film.

As shown in FIG. 1B, the camera of the present invention further comprises cleaning data recording and reproducing means 36 for storing the number of times of cleaning performed by the winding and the rewinding of the film into cleaning data record means 37 provided in the cleaning film or a cartridge for accommodating the cleaning film.

When the discrimination signal indicates that the loaded film is the cleaning film, the control means 34 inhibits the exposure control means and causes the winding means 32 to wind the film and then causes the rewinding means 33 to rewind the film. Accordingly, when the cleaning film is loaded, the cleaning film is wound and then rewound so that the cleaning is effected.

The number of times of cleaning is stored in the cleaning data record means 37 provided in the cleaning film or the cartridge for accommodating the cleaning film. Accordingly, when the number of times of usage of the cleaning film reaches a predetermined number, the cleaning may be inhibited.

BRIEF DESCRIPTION OF THE DRAWINGS

FIG. 2 shows a structure of one embodiment of a camera having a magnetic head in accordance with the present invnetion, FIG. 3 shows an outer view of a cleaning cartridge in the embodiment, FIG. 4 shows a circuit block diagram of the camera in the embodiment, FIG. 6 shows an outer view of a cleaning cartridge in another embodiment.

DESCRIPTION OF THE PREFERRED EMBODIMENTS

Figure 1A:
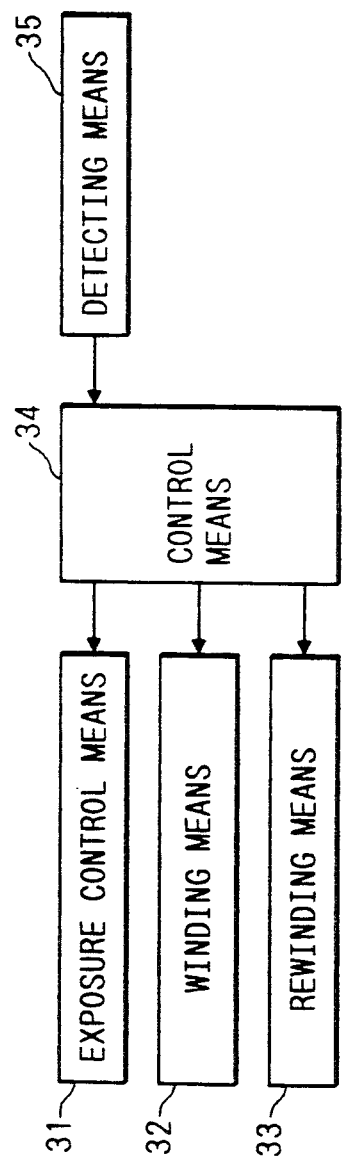
FIGS. 1A and 1B schematically show the present invention.
Figure 1B:
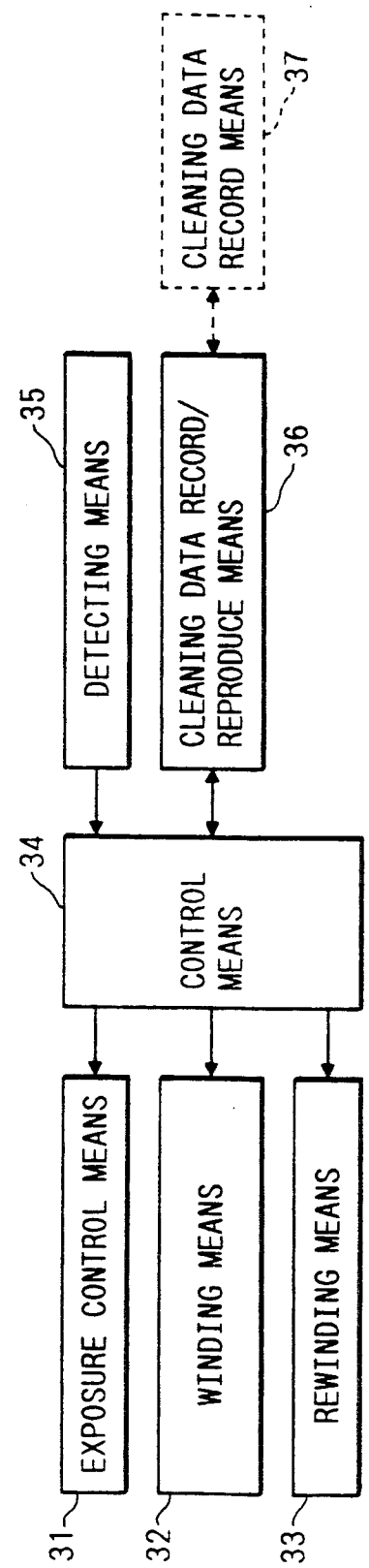

FIG. 2 shows a structure of one embodiment of a camera having a magnetic head in accordance with the present invention. A camera itself is omitted in the drawing and only internal elements are shown.

A film 2 loaded in a 35 mm film cartridge 1 is pulled out of the cartridge and wrapped around a winding spool 4 in the camera. The winding of the wrapped film 2 is effected by a winding motor 14. The rewinding of the film 2 into the cartridge 1 is effected by a rewinding motor 13. The control of the amounts of winding and rewinding of the film 2 and the detection of the ends of winding and rewinding are effected by a photo-coupler 3 which is disposed across the film 2. The photo-coupler 3 counts perforations 6 of the film 2. For example, one-frame winding is detected by counting a predetermined number of perforations corresponding to one frame by the photo-coupler 3. A condition in which the film 2 is no longer pulled out of the cartridge 1, that is, the end of film, is detected when the count of the photo-coupler 3 is not incremented in spite of the rotation of the winding motor 14. The end of the rewinding is detected in a similar manner.

Magnetic stripes 8 and 9 for recording information are provided at bottoms of photographing frames 5 and 7 of the film 2, respectively, so that information relating to the photographing frames 5 and 7 may be recorded on the magnetic stripes 8 and 9. A magnetic head 10 is arranged to abut against the film 2 at a position corresponding to the magnetic stripes 8 and 9. For example, when an object image is photographed on the frame 5 and the film 2 is wound by the winding motor 14, the magnetic stripe 8 for the frame 5 is moved in contact with the magnetic head 10 so that information is recorded by the magnetic head 10.

Type discrimination means 12 for discriminating the type of cartridge is provided to abut against a predetermined portion of the cartridge 1. The type discrimination means 12 has two terminals, one of which is grounded. A portion 11 of the cartridge 1 shown by broken lines, which the two terminals contact, is insulated. When the cartridge is loaded, the camera first senses the status of the type discrimination means 12 to determine an action to be taken. In the example shown in FIG. 2, a normal operation is permitted.

FIG. 3 shows an outer view of a cleaning cartridge. A cleaning film 16 of a predetermined length is loaded in the cleaning cartridge 15. The cleaning film 16 is provided with known cleaning means 17 at a position to which the magnetic head 10 of FIG. 2 abuts. The cleaning means 17 may be similar to that of a cleaning tape for a conventional tape recorder. It has a function of cleaning a surface of the magnetic head 10 and a function of slightly abrading the surface. Conduction means 18 is provided on a side surface of the cleaning cartridge 15. When the cleaning cartridge 15 is loaded in the camera, the two terminals of the type discrimination means 12 contact the conduction means 18 and they are shorted so that the camera can sense that the cleaning cartridge has been loaded.

FIG. 4 shows a circuit block diagram of the camera which uses the cleaning cartridge 15. A CPU 30 is located at the center and it generates outputs in accordance with input information to control the operations of the camera.

The CPU 30 senses the loading of the cartridge 1 or the cleaning cartridge 15 by an on/off state of a loading detection switch FSW, and detects the type of the loaded cartridge by the type discrimination means 12. The feeding of the film 2 or the cleaning film 16 is sensed by the photo-coupler 3. The operation of the camera is started in response to the actuation of a release switch RSW.

The winding motor 14 is driven by a first driver DVR1 and the rewinding motor 13 is driven by a second driver DVR2. The magnetic head 10 is driven by a third driver DVR3. The drivers DVR1 and DVR2 merely supply drive signals to the winding motor 14 and the rewinding motor 13, respectively, in response to the output signal of the CPU 30, but the driver DVR3 not only drives the magnetic head 10 to record information on the magnetic stripe of the film but also reproduces the information recorded on the magnetic stripe. Accordingly, signals are bilaterally transmitted between the CPU 30 and the driver DVR3. Normal exposure operation is effected by an exposure circuit EXP and various alarms and various exposure information are displayed by a display circuit DSP.

Figure 5:
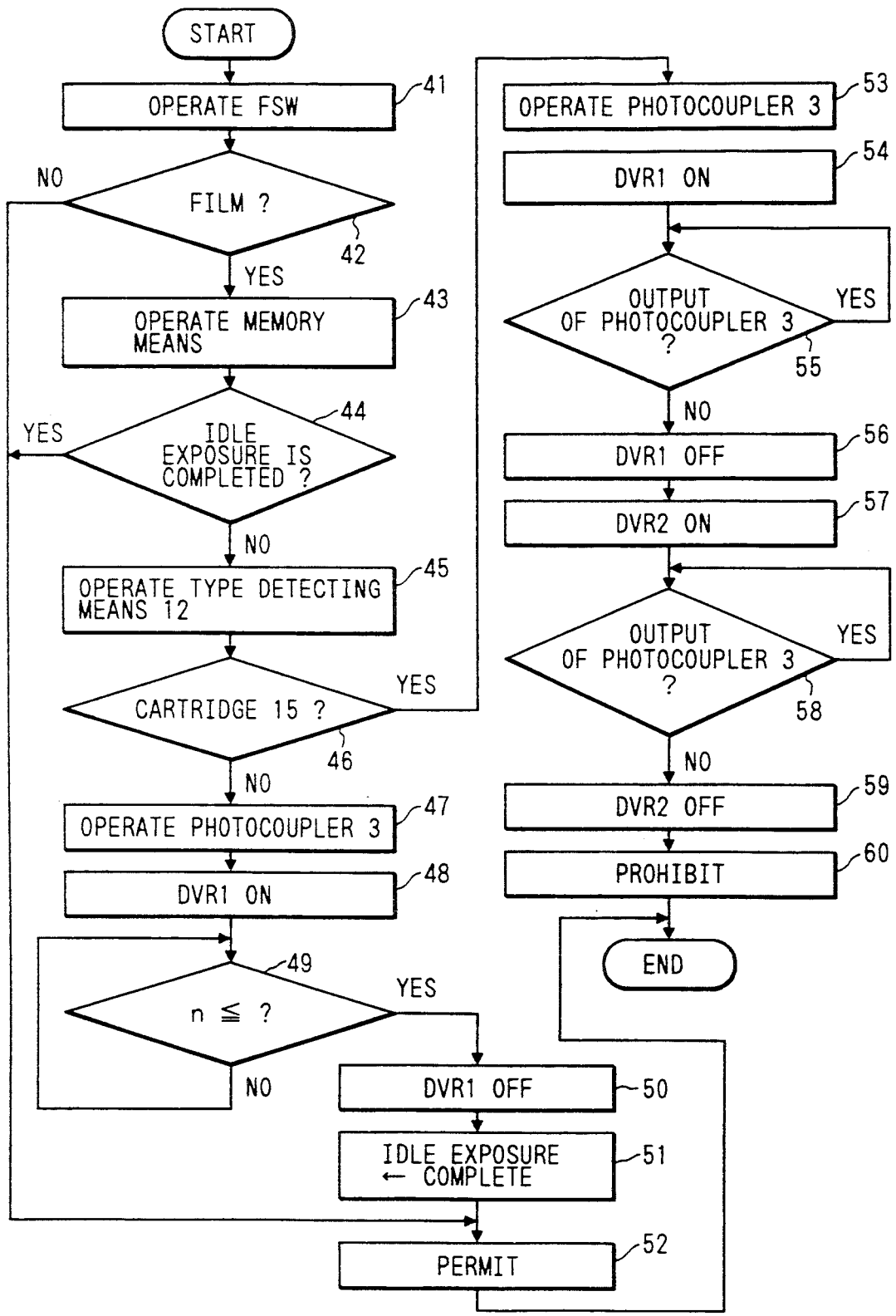
FIG. 5 shows an operation flow chart in the embodiment.

FIG. 5 shows an operation flow chart in the camera shown in FIG. 2.

When the camera is powered on by turning on a switch (not shown), the routine is started and the state of the loading detection switch FSW is sensed (step 41), and the loading of the cartridge is determined (step 42). If the cartridge is not loaded, a normal operation including exposure control of the camera is permitted and the process is terminated (step 52). When the normal operation is permitted, a conventional exposure operation is permitted even without the cartridge to enable the check of operation of the camera. On the other hand, when the loading of the cartridge is detected in the step 42, memory means in the CPU 30 is activated (step 43). The memory means stores historic data of the past operations. An idle exposure signal is read from the historic data to determine if the idle exposure has already been done or not (step 44). If a decision that the idle exposure has been done is made, the normal operation is permitted and the routine is terminated (step 52). This indicates that the photographing operation may be effected because the cartridge has been loaded and the idle exposure has been done. On the other hand, if the decision in the step 44 is that the idle exposure has not been done, the type discrimination means 12 is activated (step 45) to determine whether the loaded cartridge is a conventional cartridge or a cleaning cartridge (step 46). If the decision is that it is the conventional cartridge, the photo-coupler 3 is activated (step 47) and the driver DVR1 is activated to drive the winding motor 14 (step 48) to wrap the film 2 around the spool 4. Whether the output of the photo-coupler 3 has reached a predetermined number n or not is determined (step 49). The predetermined number n corresponds to the amount to permit the leading edge of the film 2 to wrap around the spool 4. When the film feed amount of the idle exposure reaches the predetermined number n in the step 49, the driver DVR1 is deactivated to stop the winding motor 14 (step 50), and an end of idle exposure signal is stored in the historic data in the memory means of the CPU 30 (step 51), the normal operation is permitted (step 52) and the routine is terminated.

On the other hand, if the decision in the step 46 is that the cleaning cartridge is loaded, the photo-coupler 3 is activated (step 53) and the driver DVR1 is activated (step 54). As a result, the cleaning film 16 pulled out of the cleaning cartridge 15 is wrapped around the spool 4 while it cleans the magnetic head 10. The cleaning is continued until the count of the photo-coupler 3 is no longer outputted (step 55). This means that the cleaning film 16 has been pulled out to the end, the feed of the film is stopped, and the counting of the perforations 6 by the photo-coupler 3 is no longer incremented. When the output of the photo-coupler 3 disappears in the step 55, the driver DVR1 is deactivated to stop the winding motor 14 (step 56). The driver DVR2 is activated to drive the rewinding motor 13 (step 57) so that the cleaning film 16 wound on the spool 4 is rewound back to the cleaning cartridge 15. The end of the rewinding is detected by the stop of the output of the count of the photo-coupler 3, as in the step 55 (step 58). When the end of the rewinding is detected, the driver DVR2 is deactivated to stop the rotation of the rewinding motor 13 (step 59). Then, the normal operation is inhibited and the routine is terminated (step 60). The normal operation is inhibited in the step 60 for preventing inadvertent normal photographing operation because the cleaning cartridge is loaded and preventing the abrasion of the magnetic head 10 by unnecessary cleaning operation.

FIG. 6 shows an outer view of a cleaning cartridge in another embodiment. Like the cleaning cartridge shown in FIG. 3, it is provided with condition means 24 on a side surface of a cartridge 20. A cleaning film 21 is provided with a magnetic stripe 22 in addition to cleaning means 23. The number of times of cleaning is stored in the magnetic stripe 22.

Figure 7:
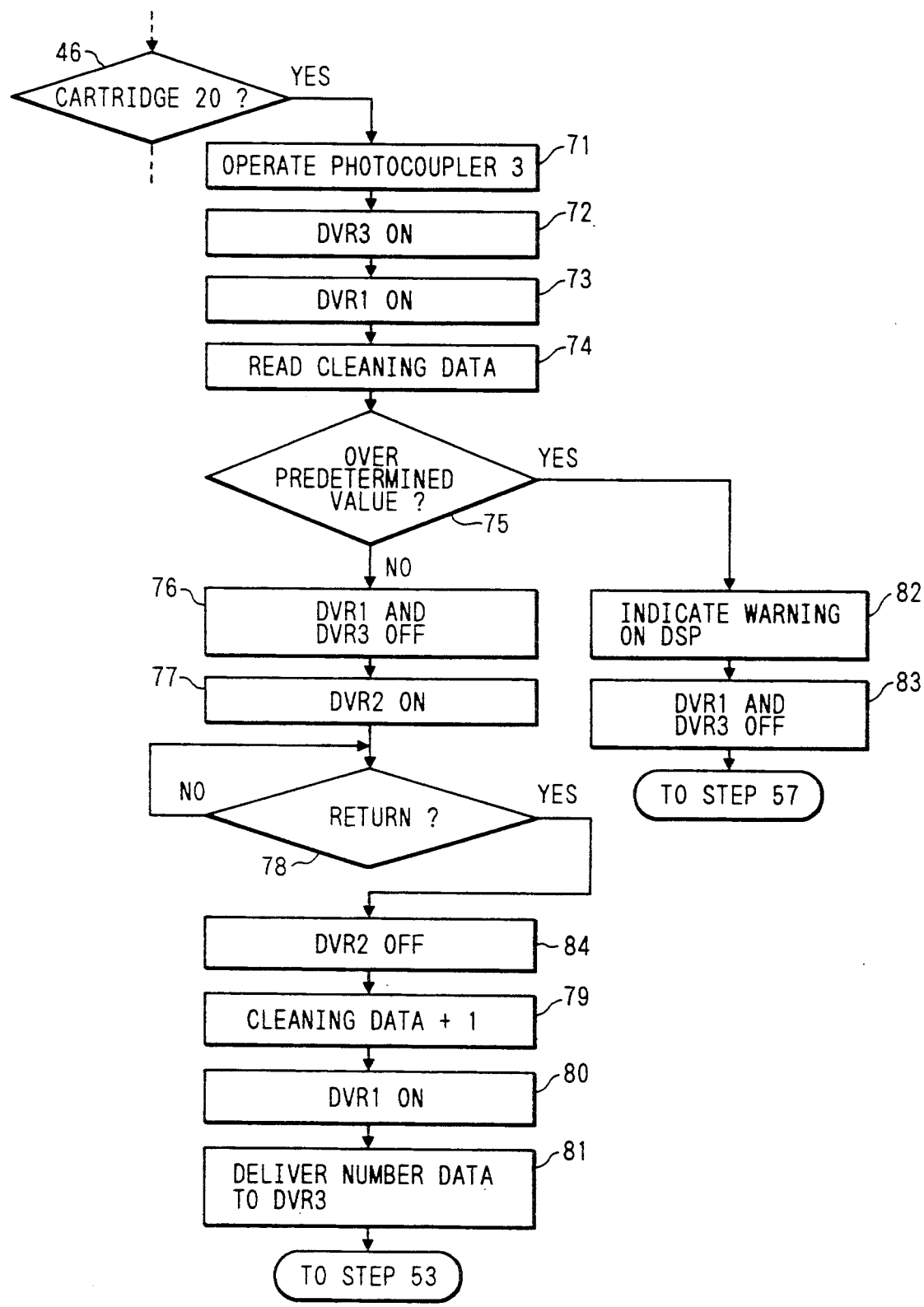
FIG. 7 shows an operation flow chart in the other embodiment.

An operation of the camera when the cleaning cartridge shown in FIG. 6 is used is now explained with reference to FIG. 7. In FIG. 7, those steps which are identical to those of FIG. 5 are omitted, and only the steps after a step 46 which are different from FIG. 5 are shown.

In the step 46, if it is determined that the loaded cartridge is a cleaning cartridge, the photo-coupler 3 is activated (step 71) and the driver DVR3 is activated to set the magnetic head 10 in a playback mode (step 72). Then, the driver DVR1 is activated to drive the winding motor 14 to wind the cleaning film 21 (step 73). Since the cleaning film 21 is moved while the magnetic head 10 is activated, the data relating to the number of times of cleaning recorded on the magnetic stripe 22 is read into the CPU 30 (step 74). The data relating to the number of times of cleaning thus read is checked to determine whether it exceeds a predetermined number or not (step 75). If the decision is that it does not exceed the predetermined number, that is, that the cleaning operation may be continued, the drivers DVR1 and DVR3 are deactivated to stop the winding motor 14 and the operation of the magnetic head 10 (step 76). Then, the driver DVR2 is activated to drive the rewinding motor 13 to rewind the pulled-out cleaning film 21 (step 77). Whether the leading edge of the cleaning film 21 has reached an initial loading position or not is determined (step 78). When the leading edge of the cleaning film 21 reaches the initial loading position, the driver DVR2 is deactivated to stop the rotation of the rewinding motor 13 (step 84) and the data relating to the number of times of cleaning stored in the CPU 30 is incremented by one (step 79). The driver DVR1 is activated to drive the winding motor 14 (step 80), the data relating to the number of times of cleaning is sent to the magnetic head 10 through the driver DVR3 and it is recorded on the magnetic stripe 22 (step 81). Thereafter, the cleaning operation followed by the rewinding is effected like the step 53 of FIG. 5.

On the other hand, if the decision in the step 75 is that the data relating to the number of times of cleaning has reached the predetermined number, an alarm signal is supplied to a display circuit DSP to cause the display circuit DSP to display the alarm inform to an operator that a durability of the cleaning cartridge 20 has been expired (step 82). The drivers DVR1 and DVR3 are deactivated to stop the winding of the winding motor 4 and the operation of the magnetic head 10 (step 83). Then, in the step 57 of FIG. 5, the pulled-out cleaning film 21 is stored into the cleaning cartridge 20.

Since the data relating to the number of times of cleaning is overwritten on the magnetic stripe 22 on the cleaning film 21, new data may be directly written when the old data written on the magnetic stripe 22 is to be updated, and it is not necessary to erase the old data.

In the embodiment shown in FIG. 6, the magnetic stripe 22 is provided on the cleaning film 21 and the number of times of cleaning is recorded thereon. Alternatively, a magnetic stripe may be formed on the cartridge 20 for accommodating the cleaning film 21, or semiconductor memory means such as an EEPROM may be provided on the cleaning film 21 or the cartridge 20 for accommodating the cleaning film 21 to record the number of times of cleaning in such memory means. In the second embodiment of the present invention, the data relating to the number of times of cleaning is written when the cleaning film is pulled out of the cartridge. Alternatively, it may be written when the cleaning film is rewound.

In accordance with the camera having the magnetic head of the present invention, when the cleaning film is loaded, the cleaning film is wound and then rewound. The magnetic head is cleaned when the cleaning film is moved through the winding and rewinding operations. Further, since the wound cleaning film is always rewound, the cleaning film is always stored in the cartridge.

We claim:

1. A camera system comprising:
   first film means having a cartridge, a film, and a magnetic recording medium;
   second film means having a cartridge and a cleaning film for cleaning a magnetic head; and
   a camera into which said first and second film means may be loaded alternatively and including a magnetic head, exposure means for exposing the film of said first film means, winding means for winding the film from the cartridge of a loaded film means, rewinding means for rewinding the film of a loaded film means back to the cartridge thereof, detection means for detecting the loading of said second film means into said camera to produce a detection signal, and control means including means for inhibiting said exposure means in response to said detection signal.

2. A camera system according to claim 1, wherein said control means includes means that causes said winding means to wind the film from the cartridge of said second film means in response to said detection signal and then causes said rewinding means to rewind the film of the second film means back to the cartridge thereof.

3. A camera system according to claim 1, wherein said second film means has a magnetic recording medium, and said control means includes means that causes said magnetic head to record data designating the number of times of usage of the cleaning film on said magnetic recording medium of said second film means when said second film means is loaded in the camera.

4. A camera system according to claim 3, wherein said control means includes means that causes said magnetic head to read the data recorded on the magnetic recording medium of said second film means in response to the loading of said second film means in said camera, and when the number of times of usage designated by the read data is smaller than a predetermined number, causes said magnetic head to record data on the magnetic recording medium of said second film means to designate an additional time of usage of the cleaning film.

5. A camera capable of alternatively loading therein first film means having a film, a magnetic recording medium and a cartridge, and second film means having a cartridge and a cleaning film for cleaning a magnetic head, comprising:
   a magnetic head for recording data on said magnetic recording medium;
   exposure means for exposing the film of said first film means;
   winding means for winding the film from the cartridge of the loaded film means;
   rewinding means for rewinding the film of the loaded film means back to the cartridge thereof;
   detection means for detecting that the film means loaded in said camera is said second film means to produce a detection signal; and
   control means including means for inhibiting said exposure means in response to said detection signal.

6. A camera according to claim 5, wherein said control means includes means that causes said winding means to wind the film from the cartridge of said second film means in response to said detection signal and then causes said rewinding means to rewind said film of said second film means back to the cartridge thereof.

7. A camera according to claim 5, wherein said second film means has a magnetic recording medium, and said control means includes means that causes said magnetic head to record data designating the number of times of usage of the cleaning film on said magnetic recording medium of said second film means when said second film means is loaded in the camera.

8. A camera according to claim 7, wherein said control means includes means that causes said magnetic head to read the data recorded on the magnetic recording medium of said second film means in response to the loading of said second film means in said camera, and when the number of times of usage designated by the read data is smaller than a predetermined number, causes said magnetic head to record data on the magnetic recording medium of said second film means to designate an additional time of usage of the cleaning film.

9. A film unit loadable in a camera having a magnetic head, comprising a cartridge containing a cleaning film having cleaning means disposed thereon for cleaning said magnetic head, said cartridge having means thereon capable of detection by said camera for informing said camera that a cartridge containing cleaning film is loaded therein.

10. A film unit according to claim 9, wherein said cleaning film has a magnetic medium thereon capable of recording data by said magnetic head.

11. A film unit loadable in a camera having a magnetic head, comprising a cartridge containing a cleaning film having cleaning means disposed thereon for cleaning said magnetic head, and information means capable of detection by said camera for informing said camera that a cartridge containing cleaning film is loaded therein.

12. A camera capable of alternatively loading therein a first film means having a film, a magnetic recording medium and a cartridge, and a second film means having a cartridge and a cleaning film for cleaning a magnetic head, comprising:

a magnetic head for recording data on said magnetic recording medium;

exposure means for exposing the film of said first film means;

winding means for winding the film from the cartridge of a loaded film means;

rewinding means for rewinding the film of the loaded film means back to the cartridge thereof;

detection means for detecting that the film means loaded in said camera is said first film means or said second film means, and for producing a detection signal indicative of the loaded film means;

control means for causing said winding means to wind the film from the cartridge of said first film means by a predetermined amount prior to an exposure operation of said exposure means when said detection signal indicates that said first film means is loaded in said camera, said control means causing said winding means to wind the film from the cartridge of said second film means by an amount larger than said predetermined amount when said detection signal indicates that said second film means is loaded in said camera.

13. A camera according to claim 12, wherein said control means causes said winding means to wind the film from the cartridge of said second film means until said cleaning film has been pulled out to an end thereof when said second film means is loaded in said camera.

14. A camera capable of alternatively loading therein a first film means having a film, a magnetic recording medium and a cartridge, and a second film means having a cartridge and a cleaning film for cleaning a magnetic head, comprising:

a magnetic head for recording data on said magnetic recording medium;

exposure means for exposing the film of said first film means;

winding means for winding the film from the cartridge of a loaded film means;

rewinding means for rewinding the film of the loaded film means back to the cartridge thereof;

detection means for detecting that the film means loaded in said camera is said first film means or said second film means, and for producing a detection signal indicative of the loaded film means;

control means for causing said winding means to wind the film from the cartridge of said first film means by a first predetermined amount prior to an exposure operation of said exposure means when said detection signal indicates that said first film means is loaded in said camera, said control means causing said winding means to wind said cleaning film from the cartridge of said second film means by a second amount and thereafter causing said rewinding means to rewind said cleaning film back to the cartridge of said second film means when said detection signal indicates that said second film means is loaded in said camera.

* * * * *